US011257087B2

(12) United States Patent
Vokes et al.

(10) Patent No.: US 11,257,087 B2
(45) Date of Patent: Feb. 22, 2022

(54) METHODS AND SYSTEMS FOR DETECTING SUSPICIOUS OR NON-SUSPICIOUS ACTIVITIES INVOLVING A MOBILE DEVICE USE

(71) Applicant: Worldpay, LLC, Symmes Township, OH (US)

(72) Inventors: Jonathan Stewart Vokes, London (GB); Daren L. Pickering, Rugby (GB)

(73) Assignee: WORLDPAY, LLC, Symmes Township, OH (US)

( * ) Notice: Subject to any disclaimer, the term of this patent is extended or adjusted under 35 U.S.C. 154(b) by 0 days.

(21) Appl. No.: 17/012,361

(22) Filed: Sep. 4, 2020

(65) Prior Publication Data
US 2020/0402066 A1 Dec. 24, 2020

Related U.S. Application Data

(63) Continuation of application No. 16/226,877, filed on Dec. 20, 2018, now Pat. No. 10,803,458.

(51) Int. Cl.
*G06Q 20/40* (2012.01)
*G06Q 20/32* (2012.01)
*G06F 21/31* (2013.01)

(52) U.S. Cl.
CPC ..... *G06Q 20/40145* (2013.01); *G06F 21/316* (2013.01); *G06Q 20/3224* (2013.01); *G06Q 20/4016* (2013.01)

(58) Field of Classification Search
CPC ......... G06Q 20/40145; G06Q 20/3224; G06Q 20/4016; G06F 21/316
See application file for complete search history.

(56) References Cited

U.S. PATENT DOCUMENTS

| | | | |
|---|---|---|---|
| 8,457,367 B1 | 6/2013 | Sipe et al. | |
| 8,762,272 B1* | 6/2014 | Cozens | G06Q 20/223 705/40 |
| 9,369,740 B1* | 6/2016 | Funk | H04N 21/44204 |
| 10,257,495 B1 | 4/2019 | Poder et al. | |
| 10,579,785 B2* | 3/2020 | Beacham | G06K 9/00255 |
| 2014/0162684 A1 | 6/2014 | Shaw | |
| 2016/0063235 A1 | 3/2016 | Tussy | |
| 2016/0337390 A1* | 11/2016 | Sridhara | G06F 21/566 |
| 2017/0255942 A1 | 9/2017 | Chandrasekaran et al. | |
| 2017/0323299 A1 | 11/2017 | Davis | |
| 2018/0293584 A1 | 10/2018 | Maheshwari et al. | |
| 2018/0366015 A1* | 12/2018 | Nashe, Jr. | G06F 21/10 |
| 2019/0080300 A1 | 3/2019 | Stojanovski | |

* cited by examiner

*Primary Examiner* — Scott C Anderson
(74) *Attorney, Agent, or Firm* — Bookoff McAndrews, PLLC

(57) ABSTRACT

Systems and methods are disclosed for detecting a suspicious and/or a non-suspicious activity during an electronic transaction performed by a user device. One method comprises identifying, by a monitoring and detection component, a starting check point in the electronic transaction. The monitoring and detection component may then receive contextual data from one or more sensors of the user device. Based on the contextual data and a machine learning model, the monitoring and detection component may determine whether an expected behavior occurred. Entry of user credentials may be enabled in response to determining that the expected behavior occurred, whereas the electronic transaction may be terminated in response to determining that the expected behavior did not occur.

20 Claims, 13 Drawing Sheets

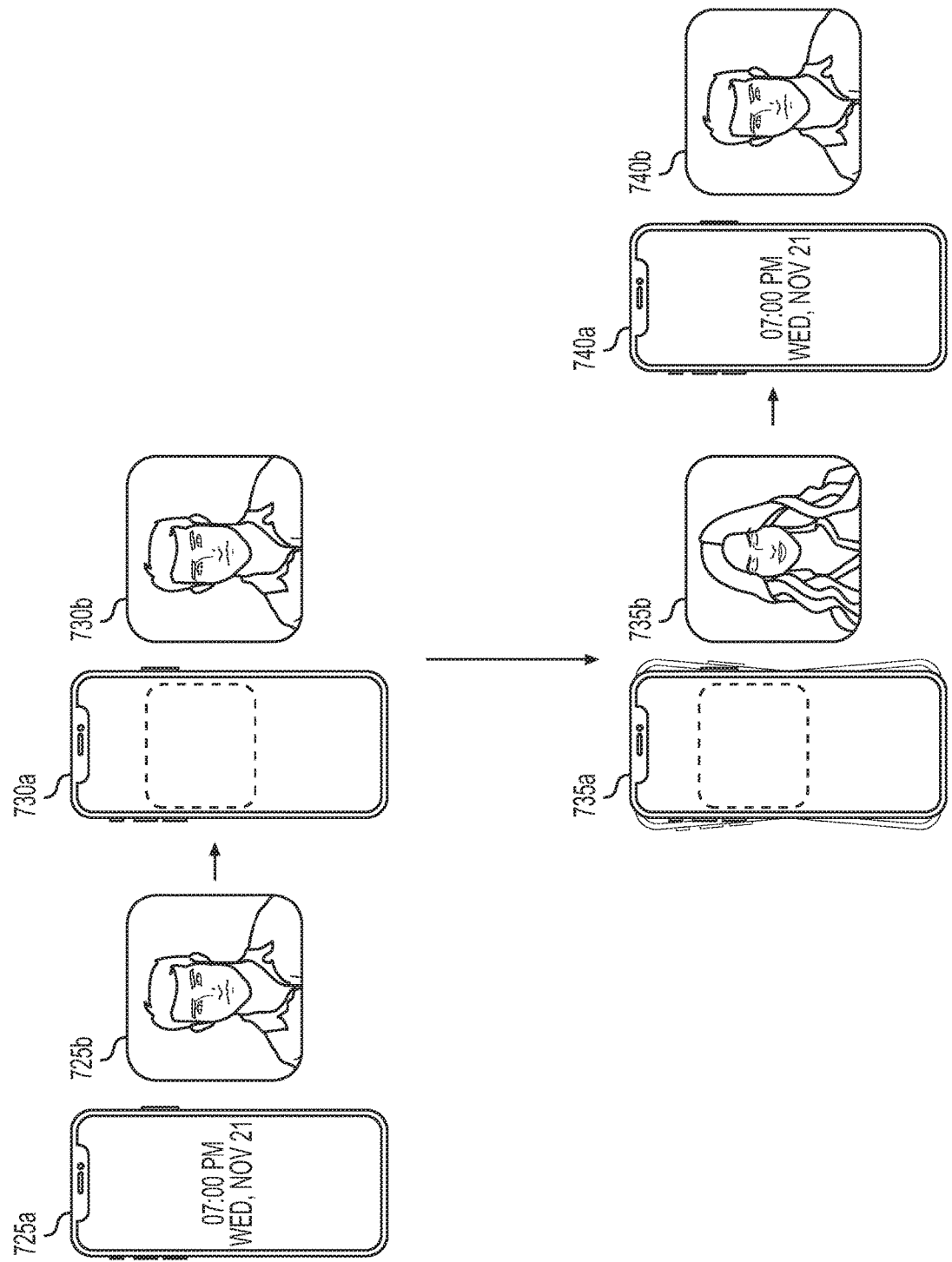

ions of the prior art, by inclusion in this section.

METHODS AND SYSTEMS FOR DETECTING SUSPICIOUS OR NON-SUSPICIOUS ACTIVITIES INVOLVING A MOBILE DEVICE USE

CROSS-REFERENCE TO RELATED APPLICATION(S)

This patent application is a continuation of and claims the benefit of priority to U.S. application Ser. No. 16/226,877 filed on Dec. 20, 2018, the entirety of which is incorporated herein by reference.

TECHNICAL FIELD

The present disclosure relates to methods and systems for detecting suspicious or non-suspicious activities involving a mobile device use. More particularly, the present disclosure relates to methods and systems for detecting suspicious or non-suspicious activities based on contextual data captured by sensors of a user device. The present disclosure further relates to methods and systems for analyzing contextual data to identify suspicious or non-suspicious activities using machine learning.

BACKGROUND

Mobile devices such as smartphones and tablets are becoming more capable of various functions based on the development of hardware, software, and accessories. One such capability is the processing of a transaction between a customer and a merchant using a mobile device. Typically, a merchant uses a mobile device and an accessory device to read information from a customer's account card and then process the transaction through a third party authorization entity. A downloadable application can turn an ordinary mobile device into a mobile point of sale or mobile payment acquiring terminal. While mobile terminals enable more people to conduct electronic payment transactions in a convenient and flexible manner, security concerns involving mobile terminals are rising.

Thus, a need exists for improving security of mobile device usage in various types of transactions. More particularly, there is a need for improving security of electronic payment transactions occurring through a mobile terminal.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for detecting a suspicious activity and/or a non-suspicious activity during an electronic transaction performed by a user device, comprising: identifying, by a monitoring and detection component, a starting check point in the electronic transaction; receiving, by the monitoring and detection component, contextual data from one or more sensors of the user device; determining, by the monitoring and detection component, whether an expected behavior occurred based on the received contextual data and a machine learning model; in response to determining that the expected behavior occurred, enabling, by the monitoring and detection component, entry of user credentials; and in response to determining that the expected behavior did not occur, terminating, by the monitoring and detection component, the electronic transaction.

One embodiment provides a system for detecting a suspicious activity and/or a non-suspicious activity during an electronic transaction performed by a user device. The system may comprise one or more processors; and a non-transitory computer readable medium storing instructions which, when executed by the one or more processors, cause the one or more processors to perform a method comprising: identifying, by a monitoring and detection component, a starting check point in the electronic transaction; receiving, by the monitoring and detection component, contextual data from one or more sensors of the user device; determining, by the monitoring and detection component, whether an expected behavior occurred based on the received contextual data and a machine learning model; in response to determining that the expected behavior occurred, enabling, by the monitoring and detection component, entry of user credentials; and in response to determining that the expected behavior did not occur, terminating, by the monitoring and detection component, the electronic transaction.

One embodiment provides a non-transitory computer readable medium for detecting a suspicious activity and/or a non-suspicious activity during an electronic transaction performed by a user device. The non-transitory computer readable medium may store instructions that, when executed by one or more processors, cause the one or more processors to perform a method comprising: identifying, by a monitoring and detection component, a starting check point in the electronic transaction; receiving, by the monitoring and detection component, contextual data from one or more sensors of the user device; determining, by the monitoring and detection component, whether an expected behavior occurred based on the received contextual data and a machine learning model; in response to determining that the expected behavior occurred, enabling, by the monitoring and detection component, entry of user credentials; and in response to determining that the expected behavior did not occur, terminating, by the monitoring and detection component, the electronic transaction.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7B is an exemplary use case diagram illustrating interactions between users and a user device during unlocking of the user device.

DETAILED DESCRIPTION OF EMBODIMENTS

Figure 1:
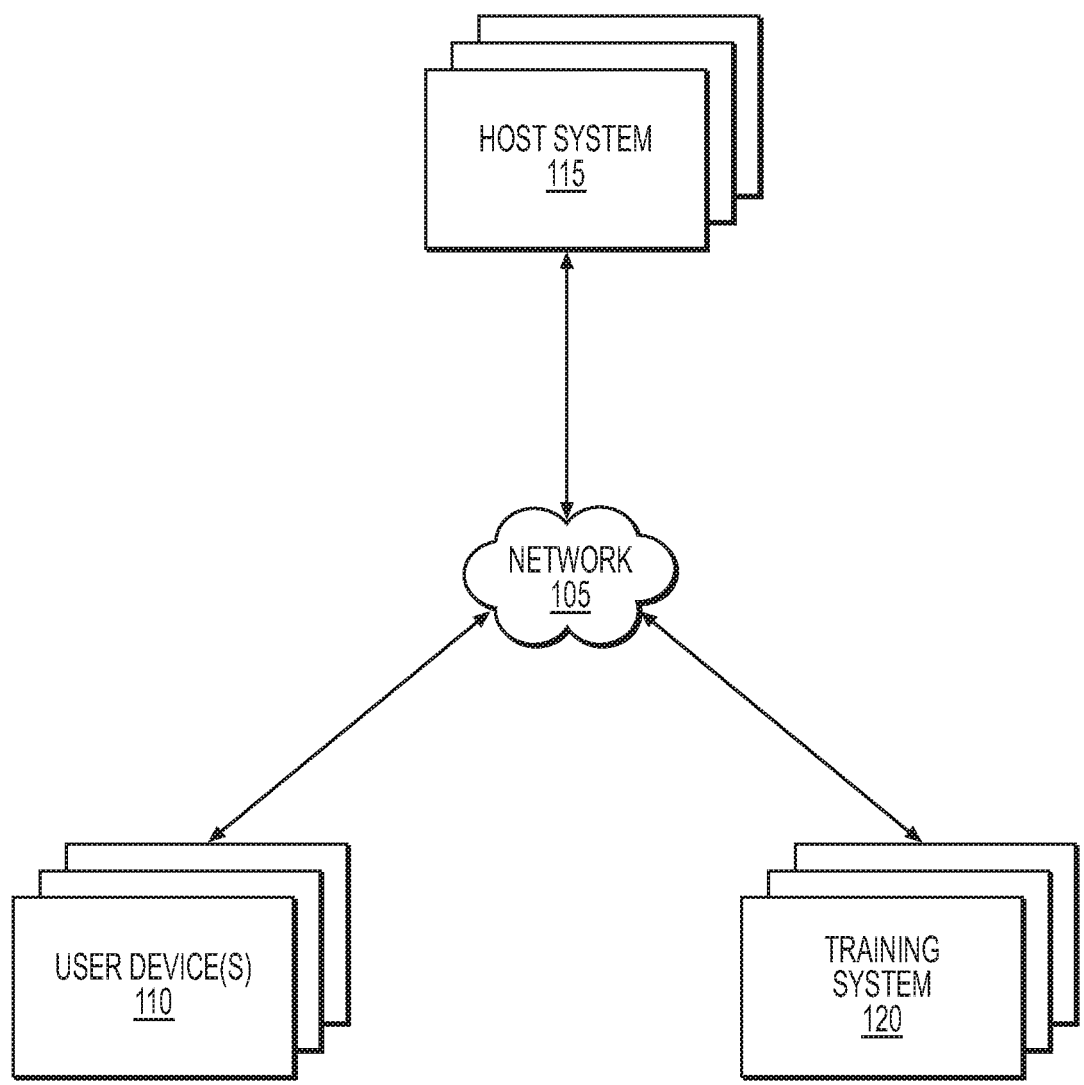
FIG. 1 depicts an exemplary system infrastructure of communicatively coupled user device(s), a host system, and a training system, according to one aspect of the present disclosure.

The following embodiments describe methods and systems for detecting suspicious or non-suspicious activities based on contextual data captured by sensors of a user device and, more particularly, for analyzing contextual data to identify suspicious or non-suspicious activities using machine learning.

With the wide spread use of mobile devices, many applications have been developed to enable mobile devices to perform various functions and transactions. For example, a downloadable software application can turn an ordinary mobile device into a mobile point of sale or mobile payment acquiring terminal (collectively, a "mobile terminal"). Using the mobile terminal, an electronic payment transaction can be initiated by a seller who may take a payment electronically from a buyer. For certain transactions, an entry of user credentials (via a security challenge) may be required upon a buyer "swiping" or "tapping" a payment vehicle at the mobile terminal. If such a transaction is initiated at a seller's mobile terminal, the security challenge may be presented on the seller's mobile device. Thus, the seller may be required to present or transfer the device to the buyer who may enter his/her user credentials. For example, the buyer may be requested to enter a personal identification number (PIN) associated with the payment vehicle.

To make this process more secure, the disclosed embodiment is directed to detecting suspicious or non-suspicious activities during an electronic transaction performed at a user device. In one embodiment, the methods and systems of the present disclosure may enable determination of whether a user device has been passed from one user to another (i.e., from a seller to a buyer) for an entry of user credentials. The determination may be based on contextual data collected from various sensors implemented in the user device. Based on the result of the determination, the entry of the user credentials may be enabled or disabled. The methods and systems of the present disclosure may be applicable to a variety of contexts, and may not be limited to the use case scenarios specifically discussed herein.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 shows an exemplary system infrastructure of communicatively coupled user device(s), a training system, and a host system. In general, FIG. 1 depicts user device(s) 110, training system 120, and host system 115, all connected via network 105. Network 105 may include the Internet, but may also include other networks such as a corporate WAN, cellular network, satellite network, or combination thereof, for example. The network 105 may be employed to enable data communications between the various entities illustrated in FIG. 1 (i.e., user device(s) 110, training system 120, and host system 115).

Figure 9:
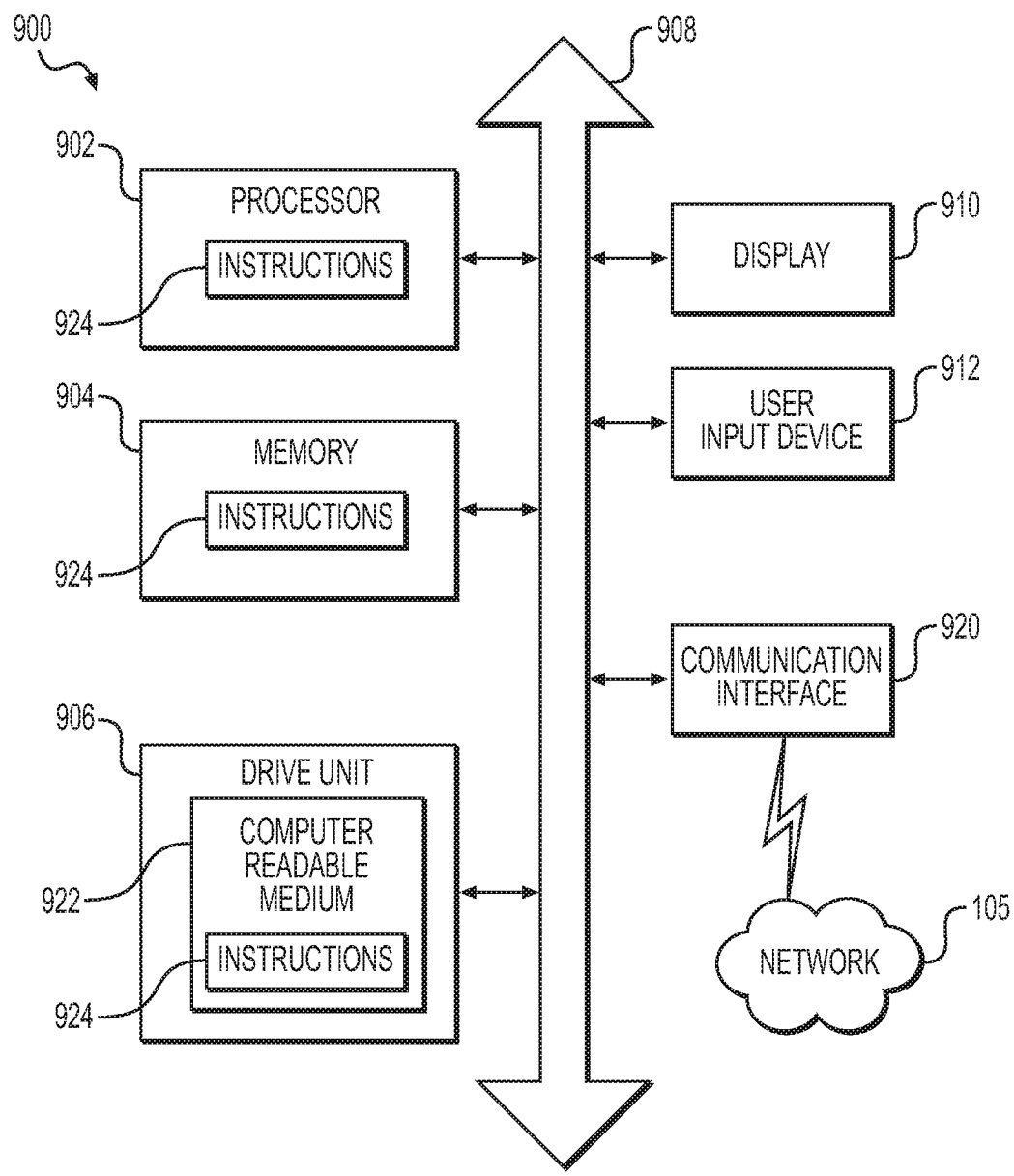
FIG. 9 illustrates an implementation of a general computer system that may execute techniques presented herein.

User device 110 may comprise a computing system consistent with or similar to that depicted in FIG. 9. In one embodiment, user device 110 may be a mobile device comprising a computing system consistent with or similar to that depicted in FIG. 9. The term "mobile device" used herein may refer to a smart phone, a table, a laptop, a smart watch, a wearable device, a gaming device, a handheld computer, a portable media player, or any other mobile or portable computing device. User device 110 may be equipped with various sensors such as, for example, global positioning system (GPS) sensors, vision sensors (i.e., cameras), audio sensors (i.e., microphones), light sensors, temperature sensors, radio frequency sensors, direction sensors (i.e., magnetic compasses, magnetometers, gyroscopes), and acceleration sensors (i.e., accelerometers). User device 110 may use these sensors to capture contextual data. The contextual data may be used to train a machine learning model and to detect suspicious and/or non-suspicious activities involving device usage. In some embodiments, user device 110 may be configured to leverage an external card reader peripheral device to become an ad hoc Point of Sale (POS) platform.

Training system 120 may comprise one or more computer servers consistent with or similar to that depicted in FIG. 9. Training system 120 may comprise a single server, or a plurality of servers distributed across the network 105. Notably, training system 120 may receive contextual data from user device(s) 110 and may train a machine learning model using the collected contextual data. Training system 120 may receive contextual data from one or more user devices 110 in order to analyze use patterns across an entire or a portion of a user base. Training system 120 may provide the trained machine learning model to user device(s) 110, in order for the user device(s) 110 to detect suspicious and/or non-suspicious activities based on contextual data captured in real-time.

Host system 115 may comprise one or more computer servers consistent with or similar to that depicted in FIG. 9. Host system 115 may comprise a single server, or a plurality of servers distributed across the network 105. Notably, host system 115 may store software applications which may be requested and downloaded by the user device(s) 110. As will be described in greater detail below, user device(s) 110 may include a user application 205 installed thereon, to perform electronic transactions, monitor device usage, and detect suspicious and/or non-suspicious activities. Such an application may be provided from the host system 115 for download. For example, host system 115 may be a server hosted by a banking institution, and the software application available for download at the host system 115 may be an electronic payment transaction application. As another example, host system 115 may be a server hosted by an application developer, and may have a variety of software applications available for download. As another example, host system 115 may be implemented as part of a payment network comprising, for example, an issuer computing system, an acquirer computing system, and a POS system. For instance, host system 115 may be implemented as part of the issuer computing system or the acquirer computing system, and may store and provide electronic transaction-related software applications to the user device(s) 110. Notwithstanding the specific exampled discussed above, in general, host system 115 may be any server suitable for storing and providing a software application to the user device(s) 110.

Figure 2A:
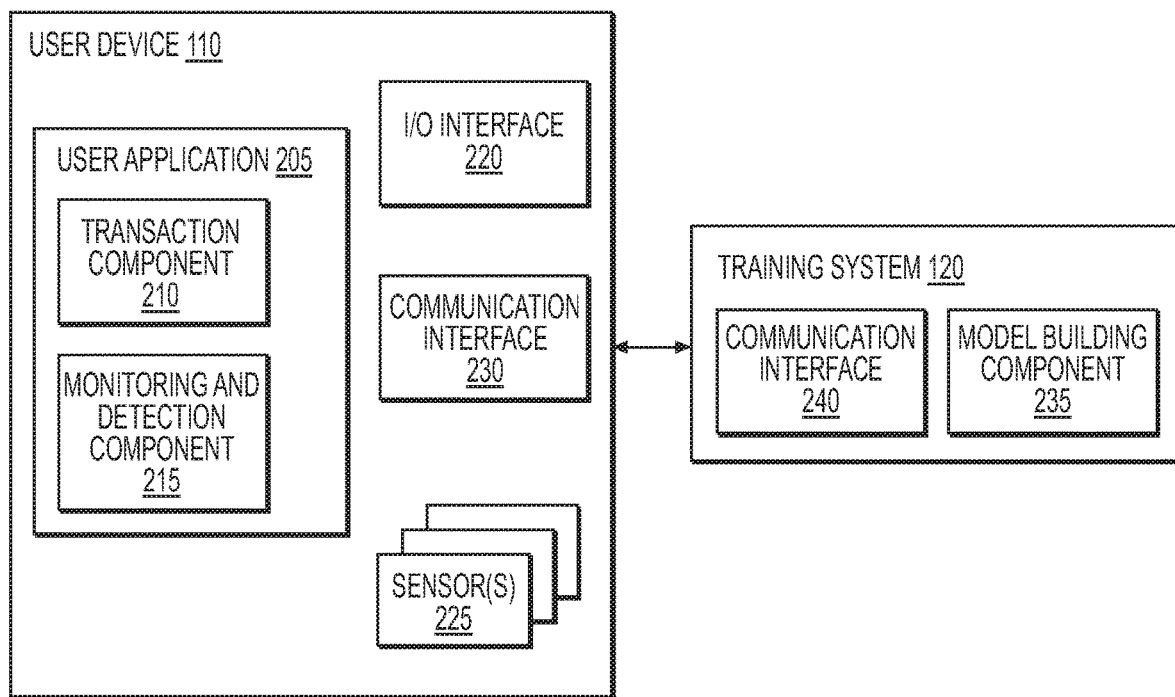
FIG. 2A depicts an exemplary embodiment of a user device and a training system, according to one aspect of the present disclosure.

FIG. 2A depicts an exemplary embodiment of a user device 110 and a training system 120, according to one aspect of the present disclosure. User device 110 may comprise a user application 205, an input/output (I/O) interface 220, sensor(s) 225, and a communication interface 230. User application 205 may be a software application downloaded from a host system 115 and installed on the user device 110. In one embodiment, user application 205 may comprise a transaction component 210 and a monitoring and detection component 215. Transaction component 210 may be configured to carry out an electronic transaction for which the user application 205 is designed. For example, if the user application 205 is an electronic payment transaction application, transaction component 210 may configure the user device 110 as an ad hoc POS platform, and may enable the user device 110 to present graphical user interface elements to walk a user through a number of steps in an electronic payment transaction. As another example, the user application 205 may be a device security application, and the transaction component 210 may enable a user to unlock the user device 110 upon receiving certain contextual data such as, for example, user biometrics (which may also involve presenting graphical user interface elements to walk a user through one or more biometrics collection steps).

Monitoring and detection component 215 may be configured to collect contextual data using one or more sensors 225 of the user device 110, in order to detect suspicious and/or non-suspicious activities involving device usage. As alluded to above, the sensor(s) 225 may include global positioning system (GPS) sensors, vision sensors (i.e., cameras), audio sensors (i.e., microphones), light sensors, temperature sensors, radio frequency sensors, direction sensors (i.e., magnetic compasses, magnetometers, gyroscopes), and acceleration sensors (i.e., accelerometers). Monitoring and detection component 215 may identify a check point (i.e., a starting check point) at which to begin capturing contextual data using the sensor(s) 225, and may also identify another check point (i.e., an ending check point) at which to halt capturing contextual data using the sensor(s) 225, based on data provided by the transaction component 210. Monitoring and detection component 215 may transmit the contextual data to training system 120 for further processing/analysis, using communication interface 230. I/O interface 220 may provide an interface to connect with peripheral devices such as, for example, display devices, integrated input mechanisms (e.g., keyboards, touch screens, mice, etc.), printers, storage devices, payment input mechanisms (e.g., magnetic card reader devices, smart card readers, optical readers, etc.), speakers and headphones, etc.

Training system 120 may comprise a model building component 235 and a communication interface 240. Model building component 235 may receive contextual data from the user device 110, and may train a machine learning model using the contextual data. In one embodiment, model building component 235 may receive contextual data from a plurality of user devices 110, train a machine learning model to be representative of behaviors across an entire or a portion of a user base, and provide the trained machine learning model to the plurality of user devices 110 (i.e. to the monitoring and detection components 215 of the user device(s) 110). In another embodiment, model building component 235 may receive contextual data from a single user device 110, train a machine learning model to be representative of behaviors localized to that user device 110, and provide the trained machine learning model to that user device 110 (i.e., to the monitoring and detection component 215 of that user device 110).

Figure 2B:
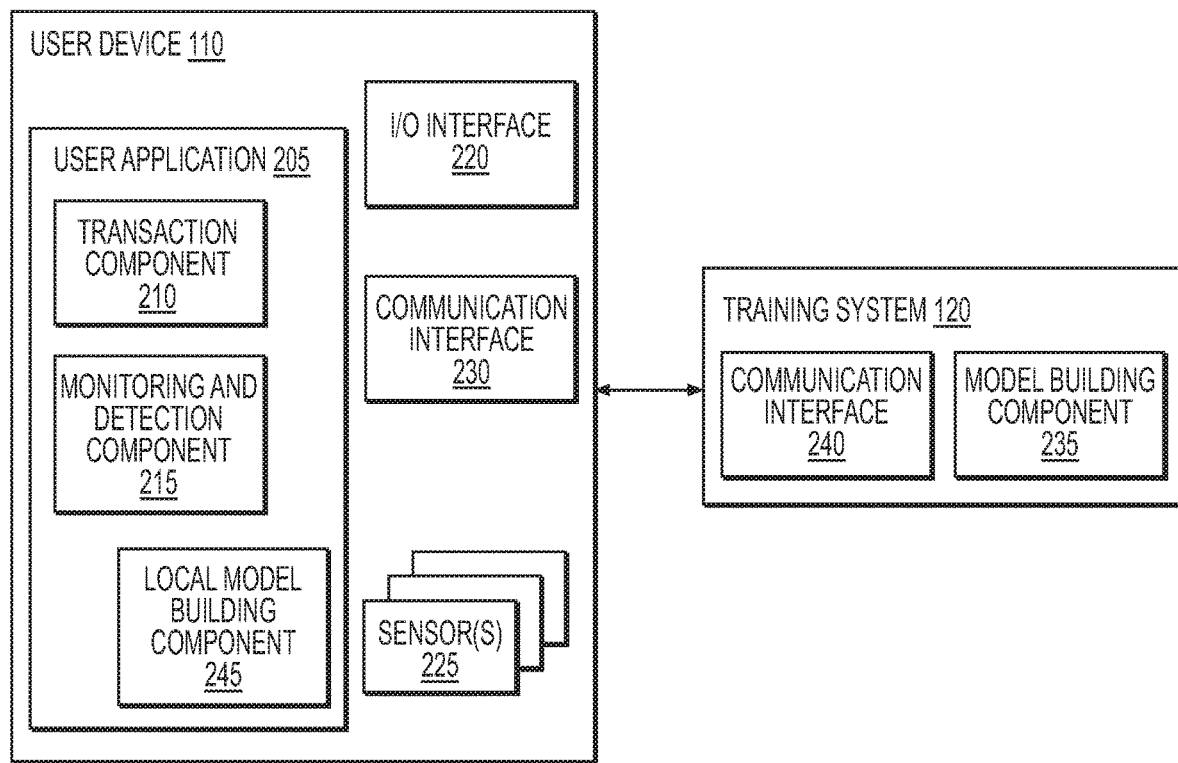
FIG. 2B depicts another exemplary embodiment of a user device and a training system, according to one aspect of the present disclosure.

In yet another embodiment, as shown in FIG. 2B, user device 110 may comprise a user application 205 including a local model building component 245, which may receive contextual data of the user device 110, train a machine learning model to be representative of behaviors specific to the user device 110, and provide the trained machine learning model to the monitoring and detection component 215 of the user device 110. Meanwhile, the model building component 235 of the training system 120 may receive contextual data from a plurality of user devices 110, train a machine learning model to be representative of behaviors across an entire or a portion of a user base, and may provide the trained machine learning model to the plurality of user devices 110. The machine learning model may be continuously or periodically updated as more contextual data become available at the user devices 110, and the updated machine learning model may be periodically provided to the user devices 110.

It should be noted that, although user device 110 and training system 120 are shown as separate entities remote from each other in FIGS. 2A-2B, the training system 120 may be implemented in the user device 110 and the processes performed by the user application 205 (e.g., transaction component 210 and monitoring and detection component 215) and the model building component 235 may all be performed within the user device 110. Furthermore, although transaction component 210, monitoring and detection component 215, and local model building component 245 are shown as separate components (i.e., application logics) within the user application 205, these components may actually be a single component (i.e., an application logic) performing all of the functions described below with respect to the transaction component 210, monitoring and detection component 215, and local model building component 245, and such a single component may be referred to as the transaction component 210 or the monitoring and detection component 215. As such, it should be appreciated that the configurations specifically discussed herein regarding the arrangement and/or the division of the components depicted in FIGS. 2A-2B are merely exemplary, and different combinations of components may be implemented on a single device (e.g., user device 110) or multiple computing devices (e.g., user device 110 and training system 120) to perform the steps described in the present disclosure.

Figure 3A:
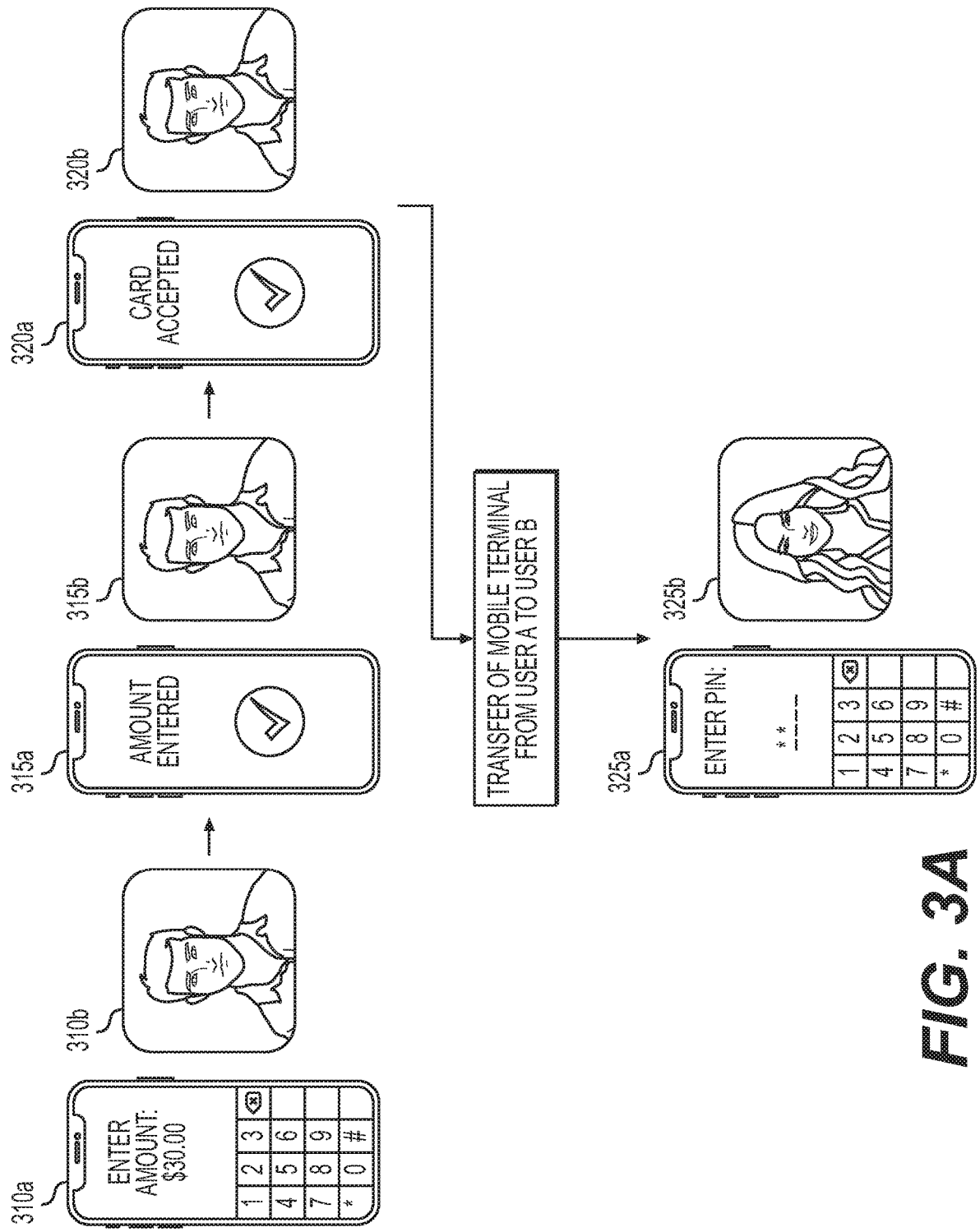
FIG. 3A is an exemplary use case diagram illustrating interactions between users and a user device during an electronic payment transaction.

As alluded to above, user device 110 may include a user application 205 configured to perform an electronic payment transaction (i.e., an electronic payment transaction application). An electronic payment transaction application may enable a seller of goods/services to use the user device 110 as POS terminal. A user device 110 being used as a POS terminal may be referred to as a "mobile terminal" throughout the present disclosure. For example, as shown in FIG. 3A (steps 310a, 315a, 320a, and 325a), users of the user device 110, such as a seller (i.e., user A) and/or a buyer (i.e., user B), may be presented with a series of graphical user interface screens to complete an electronic payment transaction. As alluded to above in reference to FIGS. 2A-2B, transaction component 210 of the user application 205 may enable the user device 110 to present the graphical user interface screens, and may also enable transmission of electronic payment transaction-related data to other entities in the payment network (e.g., an acquirer computing system, an issuer computing system, etc.) for payment authorization. Further, during the electronic payment transaction, monitoring and detection component 215 may direct one or more sensors of the user device 110 to capture contextual data. For example, as shown in FIG. 3A (images 310b, 315b, 320b, and 325b), an image sensor (i.e., a camera) may capture facial images of one or more users of the user device 110 during the electronic payment transaction, and may analyze the captured facial images (e.g., face recognition, comparison of the recognized faces, etc.) to detect a suspicious and/or non-suspicious activity.

Now with reference to FIG. 3A, more detailed description of the graphical user interface screens of the user application 205 (i.e., electronic payment transaction application) and the contextual data captured at different stages of the electronic payment transaction will be provided. Notably, FIG. 3A illustrates a context in which the embodiments contemplated by the present disclosure may be applied. At step 310a, transaction component 210 of the user application 205 may present a screen where a seller may enter a transaction amount for a sale of goods/services. At step 315a, in response to the seller entering the transaction amount, transaction component 210 may confirm that the transaction amount has been successfully entered by displaying "Amount Entered" with a check mark. Although not shown in FIG. 3A, in addition to confirming the successful entry of the transaction amount, transaction component 210 may also display instructions for a buyer to provide a payment vehicle. A payment vehicle may be embodied as a physical payment card (e.g., a traditional payment card such as a credit card, a debit card, a pre-paid card, a single-use card, etc.) or a virtual payment card (e.g., a digital wallet, etc.). The user application 205 may be configured to process both types of payment vehicle using a built-in or peripheral device such as, for example, a magnetic card reader, a contactless reader, a contactless near field communication (NFC) reader, etc. At step 320a, in response to receiving the payment vehicle, transaction component 210 may confirm that the payment vehicle has been successfully "swiped" or "tapped" at the mobile terminal.

While the transaction component 210 may perform tasks directly related to processing/completing the electronic payment transaction, monitoring and detection component 215 may collect contextual data using sensors of the user device 110, to identify suspicious and/or non-suspicious activities that might be associated with the electronic payment transaction. In one embodiment, monitoring and detection component 215 may direct an image sensor of the user device 110 (i.e., camera) to capture a facial image of the person using the device. This way, monitoring and detection component 215 may be able to capture the facial image of the person who is using or facing the device screen when the transaction amount is entered (i.e., facial image 310b), when the successful entry of the transaction amount is confirmed (i.e., facial image 315b), and/or when the successful provision of the payment vehicle is confirmed (i.e., facial image 320b). In the case of the scenario depicted in FIG. 3A, the facial images 310b, 315b, 320b captured at the electronic payment transaction stages 310a, 315a, 320a are of a seller (i.e., user A). The facial images captured during the electronic payment transaction may be stored locally and/or remotely for further analysis.

With continuing reference to FIG. 3A, once the payment vehicle is accepted by the mobile terminal (step 320a), at step 325a, transaction component 210 may present a screen where the owner of the payment vehicle (i.e., the buyer) may enter the user credentials associated with the payment vehicle. The user credentials may include, but may not be limited to, a personal identification number (PIN), a passcode, a birthday, an address, a postal/zip code, an answer to a security question, a social security number, etc. In FIG. 3A, a PIN entry screen is shown as an example. Notably, transaction component 210 may present the PIN entry screen only if the monitoring and detection component 215 determines that the person attempting to enter the PIN is different from the seller, whose facial images were captured at the earlier steps (i.e., 310a, 315a, and/or 320a) and stored. Alternatively, transaction component 210 may present the PIN entry screen subsequent to the successful provision of the payment vehicle, but may disable input of numerical digits (e.g., by hiding the numeric keypad) until the monitoring and detection component 215 determines that the person attempting to enter the PIN is different from the seller. Therefore, monitoring and detection component 215 may be configured to identify that the seller (or the person who set up and/or initiated the electronic payment transaction) has actually presented or transferred the user device 110 to a buyer to answer a security challenge (i.e., provide user credentials) for payment vehicle authentication, and ensure that it is not the seller who is attempting to provide the answer.

In one embodiment, after the payment vehicle is accepted by the mobile terminal at step 320a, monitoring and detection component 215 may direct the image sensor of the user device 110 to capture one or more facial images of the person facing the device screen. If the face recognized from the captured one or more facial images (e.g., via face recognition technology) is different from the seller's face recognized from the facial images 310b, 315b, 320b, the monitoring and detection component 215 may direct the transaction component 210 to present the PIN entry screen.

In FIG. 3A, the face recognized from the facial image 325b captured subsequent to the acceptance of the payment vehicle is different from the face recognized from any of the facial images 310a, 315a, 320b. Accordingly, the PIN entry option is displayed as shown in step 325a. In another embodiment, after the payment vehicle is accepted by the mobile terminal at step 320a, transaction component 210 may present the PIN entry option with the numeric keypad disabled or hidden. Concurrently, monitoring and detection component 215 may direct the image sensor of the user device 110 to capture one or more facial images of the person facing the device screen, and if the face recognized from the captured one or more facial images are different from that of the facial images 310b, 315b, 320b, may direct the transaction component 210 to enable or reveal the numeric keypad for PIN entry.

As will be described in greater detail in the following sections, contextual data used to detect suspicious (e.g., non-transfer of the phone, multiple faces recognized from an image captured at the PIN entry stage, etc.) and/or non-suspicious activities (e.g., transfer of the phone, a single face recognized from an image captured at the PIN entry stage, etc.) may not only include data captured by image sensors of the user device 110, but may also include data captured by other sensors of the device 110. In some cases, using various types of contextual data may provide more reliable and accurate detection results compared to using one type of contextual data. Therefore, it should be appreciated that, while the description pertaining to FIG. 3A above and FIGS. 3B-3C below may specifically discuss the use of an image sensor, other types of data may also be captured by other sensors to improve accuracy and reliability of the detection results.

Figure 3B:
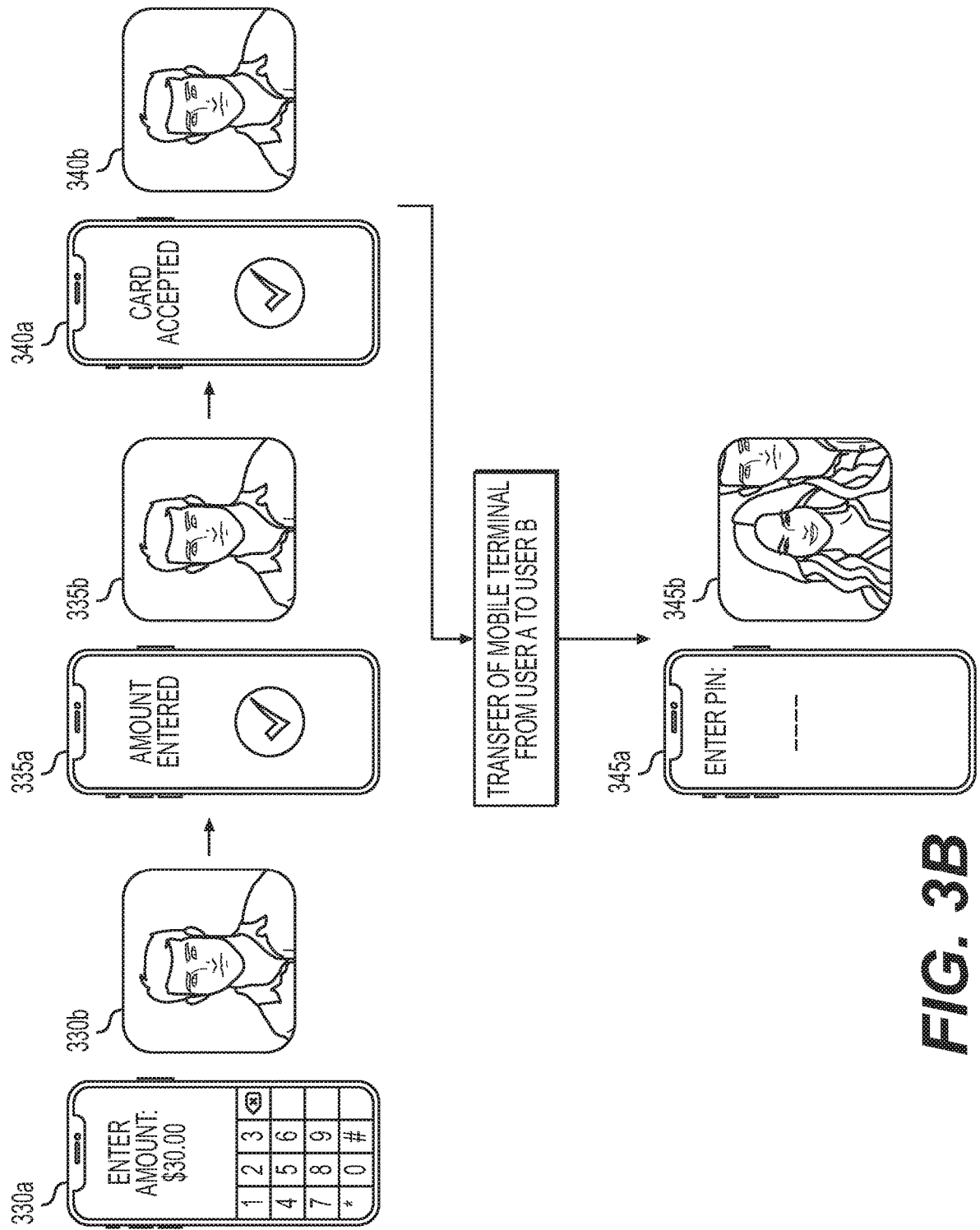
FIG. 3B is another exemplary use case diagram illustrating interactions between users and a user device during an electronic payment transaction.

FIG. 3B is another exemplary use case diagram illustrating graphical user interface screens of the user application 205 (i.e., electronic payment transaction application) and the contextual data captured at different stages of the electronic payment transaction. FIG. 3B also illustrates a context in which the embodiments contemplated by the present disclosure may be applied.

At step 330a, transaction component 210 of the user application 205 may present a screen where a seller may enter a transaction amount for a sale of goods/services. At step 335a, in response to the seller entering the transaction amount, transaction component 210 may confirm that the transaction amount has been successfully entered by displaying "Amount Entered" with a check mark. In addition to confirming the successful entry of the transaction amount, transaction component 210 may also display instructions for a buyer to provide a payment vehicle. At step 340a, in response to receiving the payment vehicle, transaction component 210 may confirm that the payment vehicle has been successfully "swiped" or "tapped" at the mobile terminal.

As discussed above in reference to FIG. 3A, to identify suspicious and/or non-suspicious activities that might be associated with the electronic payment transaction, monitoring and detection component 215 may direct an image sensor of the user device 110 to capture the facial image of the person who is using or facing the device screen when the transaction amount is entered (facial image 330b), when the successful entry of the transaction amount is confirmed (facial image 335b), and/or when the successful provision of the payment vehicle is confirmed (facial image 340b). In the case of the scenario depicted in FIG. 3B, the facial images 330b, 335b, 340b captured at the electronic payment transaction stages 330a, 335a, 340a are of a seller (i.e., user A).

Once the payment vehicle is accepted by the mobile terminal (step 340a), at step 345a, transaction component 210 may present a screen where a buyer may enter a PIN for authentication. Notably, transaction component 210 may enable the PIN entry (e.g., by displaying a numeric keypad) only if the monitoring and detection component 215 determines that the person attempting to enter the PIN is different from the seller. More particularly, transaction component 210 may enable the PIN entry only if the facial image captured at the PIN entry stage is of a single person that is different from the seller, which may indicate that the device 110 has been transferred from the seller, and that there is only one person viewing/entering the PIN. For example, in FIG. 3B, the image 345b captured at step 345a include two faces—of a buyer and a second person. Although the face of the buyer may suggest that the user device 110 has been transferred to the buyer, the face of the second person may further suggest that a person other than the buyer may be watching the PIN entry. Accordingly, the PIN entry may remain disabled until the second person moves out of the shot.

Figure 3C:
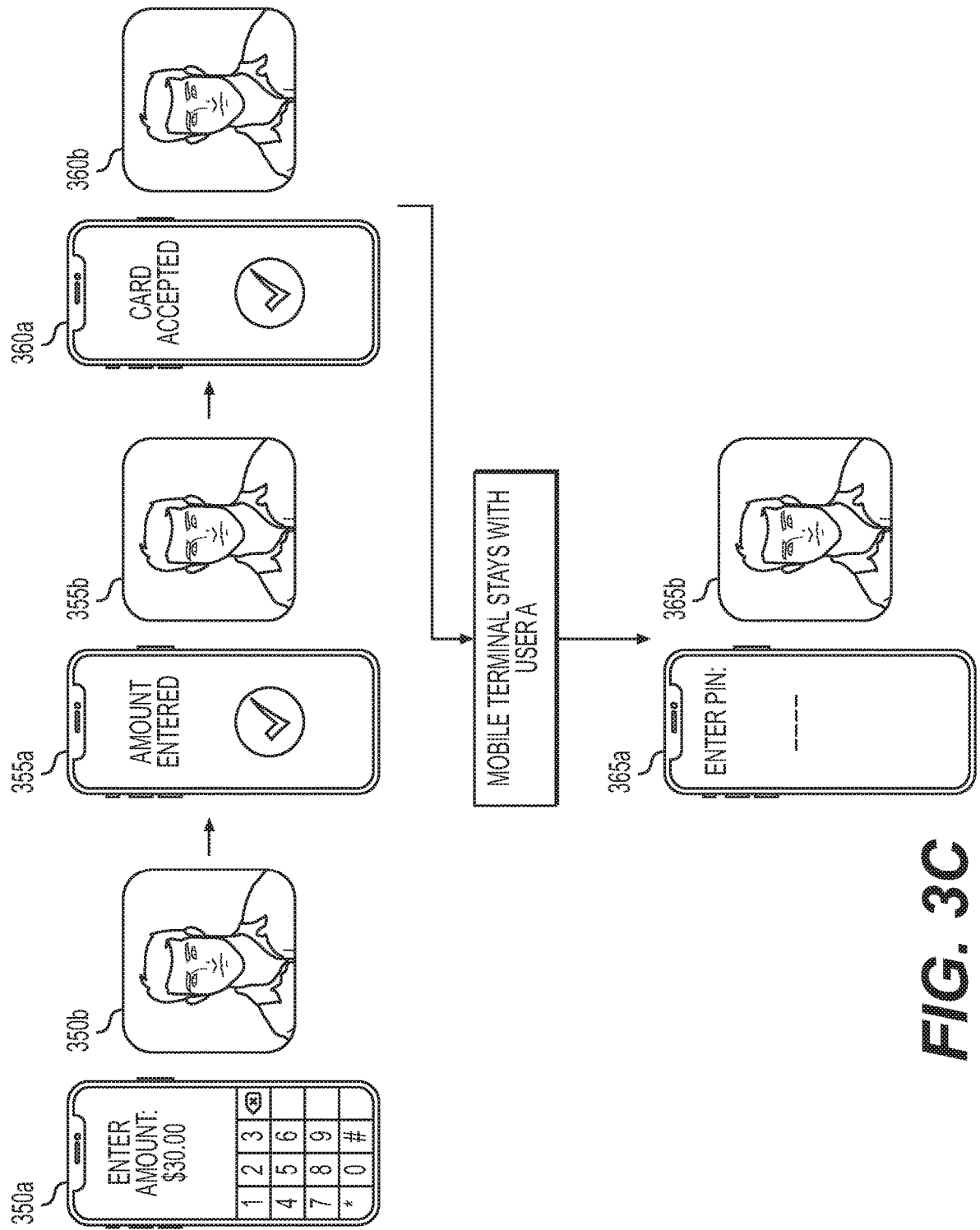
FIG. 3C is another exemplary use case diagram illustrating interactions between a user and a user device during an electronic payment transaction.

FIG. 3C is another exemplary use case diagram illustrating graphical user interface screens of the user application 205 (i.e., electronic payment transaction application) and the contextual data captured at different stages of the electronic payment transaction. FIG. 3C also illustrates a context in which the embodiments contemplated by the present disclosure may be applied.

At step 350a, transaction component 210 of the user application 205 may present a screen where a seller may enter a transaction amount for a sale of goods/services. At step 355a, in response to the seller entering the transaction amount, transaction component 210 may confirm that the transaction amount has been successfully entered by displaying "Amount Entered" with a check mark. In addition to confirming the successful entry of the transaction amount, transaction component 210 may also display instructions to provide a payment vehicle. At step 360a, in response to receiving the payment vehicle, transaction component 210 may confirm that the payment vehicle has been successfully "swiped" or "tapped" at the mobile terminal.

As discussed above in reference to FIG. 3A, to identify suspicious and/or non-suspicious activities that might be associated with the electronic payment transaction, monitoring and detection component 215 may direct an image sensor of the user device 110 to capture the facial image of the person who is using or facing the device screen when the transaction amount is entered (facial image 350b), when the successful entry of the transaction amount is confirmed (facial image 355b), and/or when the successful provision of the payment vehicle is confirmed (facial image 360b). In the case of the scenario depicted in FIG. 3C, the facial images 350b, 355b, 360b captured at the electronic payment transaction stages 350a, 355a, 360a are of a seller (i.e., user A).

Once the payment vehicle is accepted by the mobile terminal (step 360a), at step 365a, transaction component 210 may present a screen where a buyer may enter a PIN for authentication. Notably, transaction component 210 may enable the PIN entry (e.g., by displaying a numeric keypad) only if the monitoring and detection component 215 determines that the person attempting to enter the PIN is different from the seller. In FIG. 3C, the facial image 365b captured at step 365a is that of the same person (i.e., the seller, who set up or initiated the electronic payment transaction) compared to the previously-captured facial images 350b, 355b, 360b, indicating that the user device 110 has stayed with the seller (i.e., non-transfer of the user device 110). Accordingly, the PIN entry may remain disabled until a facial image of the buyer, and only of the buyer, is captured by the image sensor, indicating that the user device 110 has been transferred to the buyer and that there is no one else watching the PIN entry but the buyer. In some embodiments, a hash of the biometrics of individuals using the device 110 may be stored for each transaction in order to detect instances of a third party attempting to enter PINs for a number of different buyers.

Again, although the description provided in relation to the exemplary use cases illustrated in FIGS. 3A-3C only discussed the usage of image data (e.g., facial images captured by an image sensor) to detect suspicious and/or non-suspicious activities, various types of contextual data captured by multiple sensors may be used to more accurately detect suspicious and/or non-suspicious activities. For example, while the act of transferring the user device 110 (or the lack thereof) from a seller (i.e., user A) to a buyer (i.e., user B) for a PIN entry may be inferred from facial images captured at different stages of the electronic payment transaction, additional contextual data may be captured using other sensors to provide more accurate and reliable results. As alluded to above in reference to FIG. 1, user device 110 may contain a number of sensors, which may provide various information about the environment around the user device 110 (i.e., contextual data). For example, a user device 110 may use the following sensors to capture various types of contextual data to detect suspicious and/or non-suspicious activities:

Microphones: User device 110 may include at least two microphones. The microphones used on the device 110 may comprise a telephone microphone and a background noise microphone used for noise cancellation. Some devices may also have more than one microphone in order to record in stereo or surround sound. Each microphone may detect a slightly different sound. As device 110 is moved within an environment, the sounds detected by each microphone may change. If the device 110 is rotated, the sounds measured by the microphones on the device 110 may also appear to rotate. A full 360-degree rotation may, for instance, create an illusion that the sounds will swap from one microphone to the other. By measuring the sound patterns picked up by the multiple microphones, it may be possible to deduce a rotation of the device 110 (e.g., a rotation that might be involved when a mobile terminal is presented to a buyer for a security challenge), a movement of the device 110, and/or a transfer of the device 110 from one location/person to another, based on the changes in sound.

Radio frequency sensors: A number of radio frequencies may be picked up by the user device 110. These may include Wi-Fi, Bluetooth, Cellular signal, FM radio, etc. A change in these signals can indicate movement. A combination of these signals may be used to create a radio transmission map, which may be used to forensically locate user devices 110.

Accelerometer, gyroscope & GPS, and magnetometer: A combination of the accelerometer, gyroscope, and magnetometer can be used to detect both the orientation and movement of the user device 110. A built-in GPS may also be used to determine the location of the device. The accelerometer may measure the vector displacement of a user device 110 in three dimensions in relation to the X, Y and Z axis. The Gyroscope may measure the rotation of a user device 110, measured around the X, Y and Z axis. The Magnetometer may be a built-in magnetic compass that may be used alongside the gyroscope to calculate a reference in relation to the magnetic north. There may also be a gravity sensor that may be used to identify which way is up. The GPS may be used to determine the longitude and latitude of the user device 110. In one embodiment, when the user device 110 is moved from one party to another, the combination of the data from the accelerometer, gyroscope, and the magnetometer may be used to represent that movement. Using machine learning, an artificial intelligence (AI) system (e.g., a machine learning model) may gradually be trained to recognize the patterns that relate to a user device 110 being passed from one person to another.

Cameras: The front and back-facing cameras on the user device 110 may be used alongside image recognition to determine movement in different directions. This movement may then be used to deduce relocation or rotation of the device 110. If an object in the background is identified as a distinct object, then the movement of that object in relation of the user device 110 may be used to determine that the user device 110 is moving. By measuring a number of objects in the environment, the movement of the phone within three dimensional space may be calculated. The autofocus of the camera on the user device 110 may also be used to measure depth of field. If an object believed to be static moves in and out of focus, then it may be deduced that the user device 110 is moving. The cameras may also be used alongside face recognition to help prevent the PIN or security challenge answer from being revealed to a third party.

Figure 4:
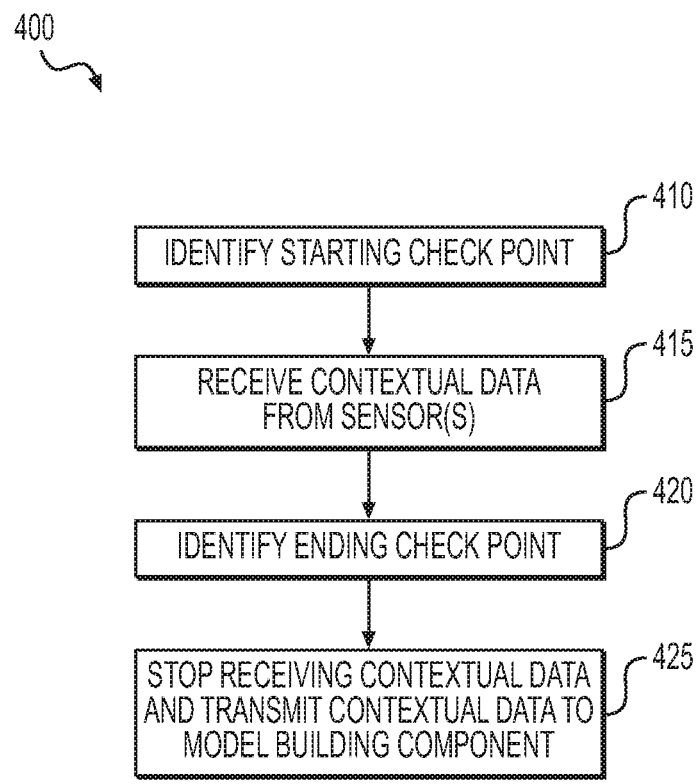
FIG. 4 is a flowchart illustrating an exemplary method of aggregating contextual data for model building, according to one aspect of the present disclosure.

FIG. 4 is a flowchart illustrating an exemplary method 400 of aggregating contextual data for model building, according to one aspect of the present disclosure. In particular, the steps of method 400 may be performed by the monitoring and detection component 215. The aggregated contextual data may be used to train a machine learning model in order to identify a suspicious and/or non-suspicious activity. Therefore, the contextual data aggregated in method 400 may also be referred to as "training data."

At step 410, monitoring and detection component 215 may identify a starting check point. The starting check point defines a point from which one or more appropriate sensors of the user device 110 may capture contextual data. For instance, in the case of an electronic payment transaction (e.g., FIGS. 3A-3C), transaction component 210 may alert the monitoring and detection component 215 to begin capturing contextual data at a particular stage of the electronic payment transaction. For example, transaction component 210 may alert the monitoring and detection component 215 to begin capturing contextual data when a graphical user interface screen for transaction amount entry is displayed (e.g., step 310*a* in FIG. 3A, step 330*a* in FIG. 3B, or step 350A in FIG. 3C). In such a case, the point at which the graphical user interface screen for transaction amount entry is displayed may be the starting check point. However, the starting check point may be set at any point during a transaction.

At step 415, monitoring and detection component 215 may start receiving contextual data from the one or more appropriate sensors of the user device 110. At step 420, monitoring and detection component 215 may identify an ending check point. The ending check point defines a point at which the one or more appropriate sensors of the user device 110 may halt capturing contextual data. Notably, the ending check point and the starting check point may be set such that one or more sensors of the user device 110 continue to capture the contextual data when the target activity (i.e., suspicious and/or non-suspicious activity) takes place. For example, in the case of an electronic payment transaction (e.g., FIGS. 3A-3C), the starting point and the ending point may be set such that the one or more sensors of the user device 110 capture the transfer (or the lack thereof) of the user device 110 from one person to another (e.g., from a seller to a buyer, etc.).

Once the monitoring and detection component 215 identifies the ending check point (step 420), at step 425, monitoring and detection component 215 may stop receiving contextual data from the one or more appropriate sensors of the user device 110, and may transmit the aggregated contextual data to either one of or both the model building component 235 of the training system 120 (to analyze behavior patterns across an entire or a portion of a user base) and the local model building component 245 of the user application 205 (to analyze behavior patterns localized to the user device 110). For example, in the case of an electronic payment transaction (e.g., FIGS. 3A-3C), the ending check point may be when the PIN is successfully entered by a payment vehicle owner. However, the ending check point may be set at any suitable point during a transaction.

In another embodiment, monitoring and detection component 215 may start transmitting the contextual data to the model building component as soon as it starts receiving the contextual data from the one or more sensors (i.e., from the starting check point). In other words, instead of waiting until the ending checking point is identified and sending aggregated contextual data to the model building component, monitoring and detection component 215 may transmit the contextual data as they are being captured, during the time period between the starting check point and the ending check point.

Figure 5:
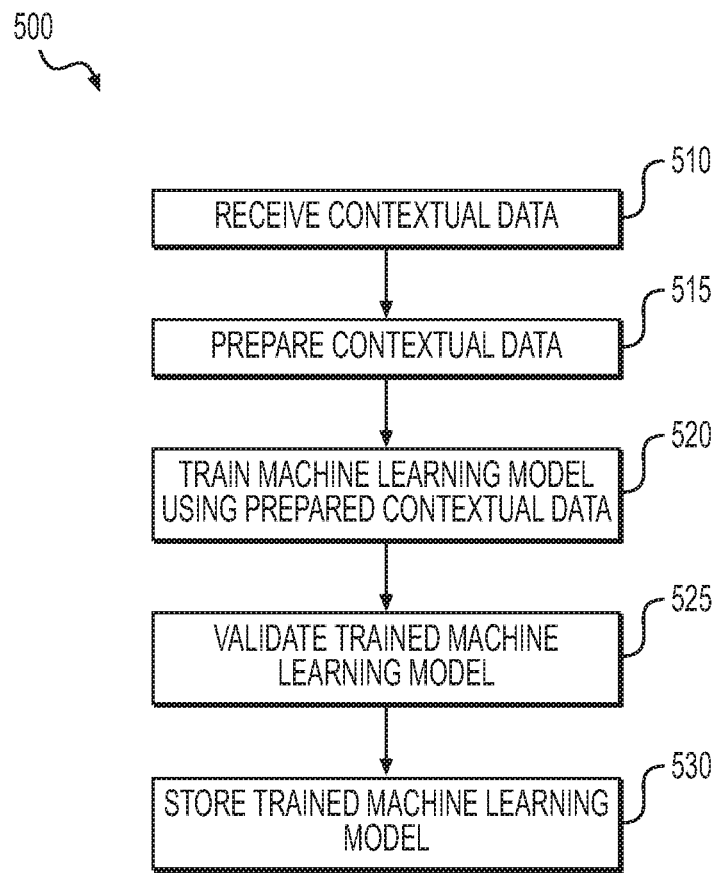
FIG. 5 is a flowchart illustrating an exemplary method of training a machine learning model, according to one aspect of the present disclosure.

FIG. 5 is a flowchart illustrating an exemplary method 500 of training a machine learning model, according to one aspect of the present disclosure. In particular, the steps of method 500 may be performed by either one of or both the model building component 235 and the local model building component 245. For the sake of brevity, in the following discussion, it will be assumed that the steps of method 500 are performed by the model building component 235. However, it should be appreciated that the steps of method 500 may also be performed by the local model building component 245.

At step 510, model building component 235 may receive contextual data from the user device 110 (or the monitoring and detection component 215 thereof). At step 515, model building component 235 may prepare the received contextual data for model training. Data preparation may involve randomizing the ordering of the contextual data, visualizing the contextual data to identify relevant relationships between different variables, identifying any data imbalances, splitting the contextual data into two parts where one part is for training a model and the other part is for validating the trained model, de-duplicating, normalizing, correcting errors in the contextual data, and so on.

Once the contextual data is prepared (step 515), at step 520, model building component 235 may train a machine learning model using the prepared contextual data. The trained machine learning model could analyze contextual data associated with a suspicious activity to detect one or more patterns associated with the suspicious activity, and could also analyze contextual data associated with a non-suspicious activity to detect one or more patterns that are associated with the non-suspicious activity. In some embodiments, training of the machine learning model may result in a set of model weights, which can then be used to validate the machine learning model and perform detections via the machine learning model.

At step 525, model building component 235 may validate the trained machine learning model based on, for example, the model weights generated at step 520. For example, the machine learning model may be validated by analyzing a set of contextual data that are known to represent a suspicious or a non-suspicious activity. Accordingly, the accuracy of the machine learning model and model weights may be determined. Once the validation step is complete, at step 530, model building component 235 may store the trained (and validated) machine learning model in a system memory or storage. The trained machine learning model may then be transmitted to and used by the monitoring and detection component 215 of the user device 110 to detect suspicious and/or non-suspicious activities involving device usage.

Figure 6:
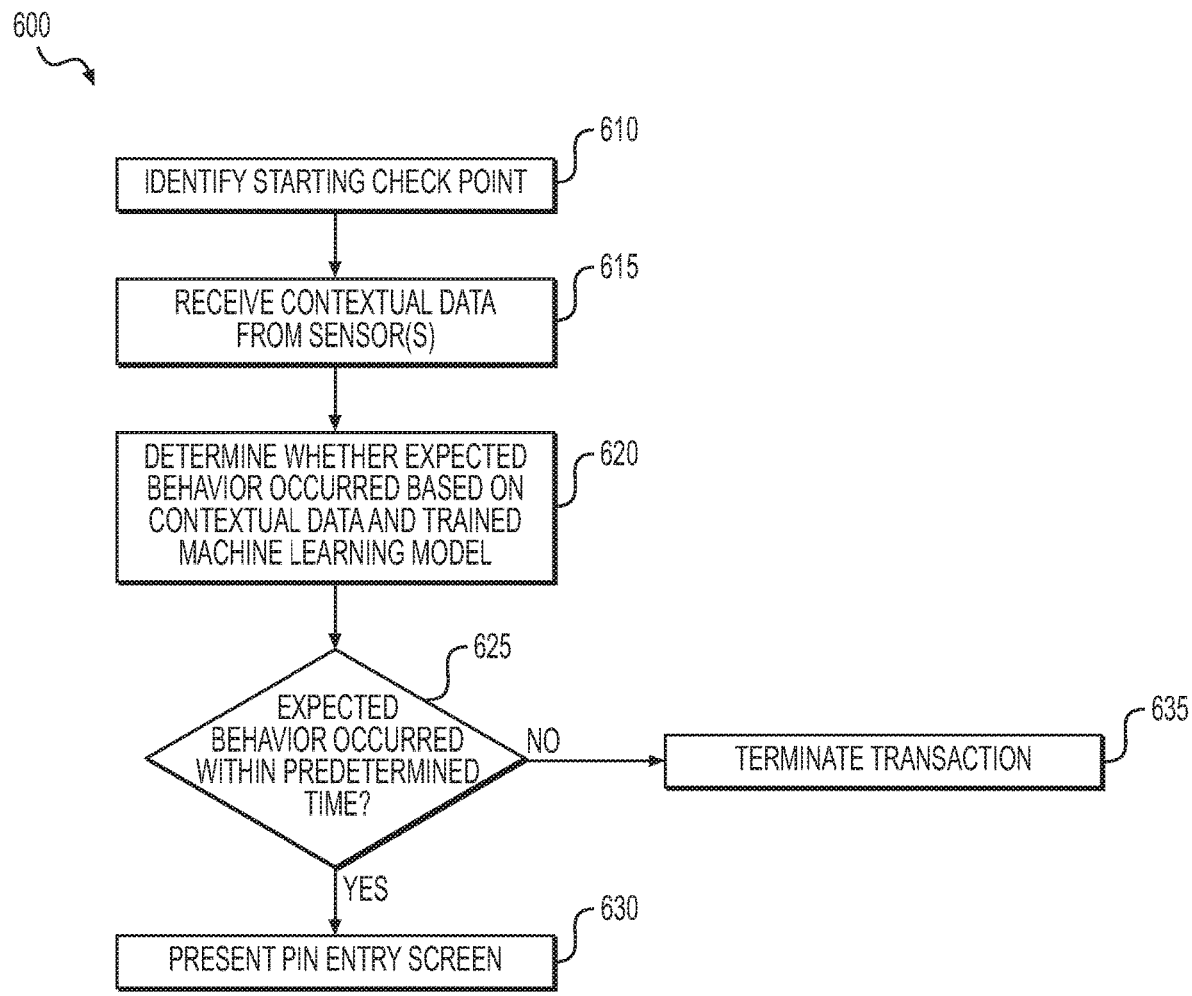
FIG. 6 is a flowchart illustrating an exemplary method of analyzing contextual data to determine an occurrence of an expected activity, according to one aspect of the present disclosure.

FIG. 6 is a flowchart illustrating an exemplary method 600 of determining an occurrence of an expected activity (i.e., a non-suspicious activity) using a trained machine learning model, according to one aspect of the present disclosure. In particular, the steps of method 600 may be performed by the monitoring and detection component 215, and may be performed in contexts described above with reference to FIGS. 3A-3C (i.e., electronic payment transaction). However, it should be appreciated that the steps of method 600 may be used in any context to which they may be applicable.

At step 610, monitoring and detection component 215 may identify a starting check point. As alluded to above in reference to step 410 in FIG. 4, the starting check point defines a point from which one or more appropriate sensors of the user device 110 may capture contextual data. For instance, in the case of an electronic payment transaction (e.g., FIGS. 3A-3C), transaction component 210 may alert the monitoring and detection component 215 to begin capturing contextual data at a particular stage of the electronic payment transaction. For example, transaction component 210 may alert the monitoring and detection component 215 to begin capturing contextual data when a graphical user interface screen for transaction amount entry is displayed (e.g., step 310*a* in FIG. 3A, step 330*a* in FIG. 3B, or step 350A in FIG. 3C). In such a case, the point at which the graphical user interface screen for transaction amount entry is displayed may be the starting check point. However, the starting check point may be set at any point of a transaction.

At step 615, monitoring and detection component 215 may start receiving contextual data from the one or more sensors of the user device 110. Then, at step 620, monitoring and detection component 215 may determine whether an expected behavior (e.g., transfer of a user device 110 from one user to another, etc.) has occurred based on the received contextual data and a trained machine learning model received from the model training component 235 (or from the local model training component 245).

At step 625, if it is determined that an expected behavior occurred within a predetermined time, the method may proceed to step 630 where the monitoring and detection component 215 may present a PIN entry screen or enable PIN entry (or entry of any type of user credentials as discussed above), or may direct transaction component 210 to present the PIN entry screen or enable PIN entry. At this point (step 630), the monitoring and detection component 215 may also stop receiving contextual data from the one or more sensors (or may direct the one or more sensors to stop transmitting contextual data), as the decision to enable the PIN entry has been made. The point at which to stop receiving contextual data from the one or more sensors may be referred to as an ending check point.

On the other hand, at step 625, if it is determined that an expected behavior did not occur within a predetermined time, the method may proceed to step 635 where the monitoring and detection component 215 may terminate the transaction, or may direct the transaction component 210 to terminate the transaction. At this point (step 635), the monitoring and detection component 215 may also stop receiving contextual data from the one or more sensors (or may direct the one or more sensors to stop transmitting contextual data), as the decision to terminate the transaction has been made.

In another embodiment, at step 635, the monitoring and detection component 215 may cause the user device 110 to display instructions to hand the user device 110 to a buyer (i.e., a payment vehicle owner). In yet another embodiment, at step 635, the monitoring and detection component 215 may send a notification to the owner of the payment vehicle (e.g., via an email, a text message, an automated phone call, etc.) that a suspicious activity involving the payment vehicle has occurred.

In an alternative embodiment, at step 630, the monitoring and detection component 215 may keep the PIN entry disabled, and may perform additional authentication processes for added security (e.g., processes described in reference to FIGS. 3A-3C). For example, the monitoring and detection component 215 may continue to capture one or more facial images of the user facing the user device 110 even after determining that the device transfer has occurred. A facial image captured after determining that the device transfer has occurred may be referred to as a post-transfer facial image. The monitoring and detection component 215 may analyze the post-transfer facial images to determine whether more than one user is staring at the screen of the user device 110. If it is determined that there are more than one user staring at the screen of the user device 110, the monitoring and detection component 215 may terminate the transaction or postpone the PIN entry until there is only one person in a subsequently-captured post-transfer facial image. If it is determined that there is just one user staring at the screen of the user device 110, the monitoring and detection component 215 may either i) enable the PIN entry or ii) proceed with yet another authentication process. For example, the monitoring and detection component 215 may compare the one or more post-transfer facial images to the one or more facial images that are captured prior to determining that the device transfer has occurred (i.e., pre-transfer facial images). If it is determined that the face recognized in the post-transfer facial images is different from the face recognized in the pre-transfer facial images, the monitoring and detection component 215 may present a PIN entry screen or enable PIN entry.

At this point, the monitoring and detection component 215 may also stop receiving contextual data from the one or more sensors (or may direct the one or more sensors to stop transmitting contextual data), as the decision to enable the PIN entry has been made. If it is determined that the face recognized in the post-transfer facial images is the same as the face recognized in the pre-transfer images, the monitoring and detection component 215 may terminate the transaction, as discussed above. At this point, the monitoring and detection component 215 may also stop receiving contextual data from the one or more sensors (or may direct the one or more sensors to stop transmitting contextual data), as the decision to terminate the transaction has been made.

Figure 7A:
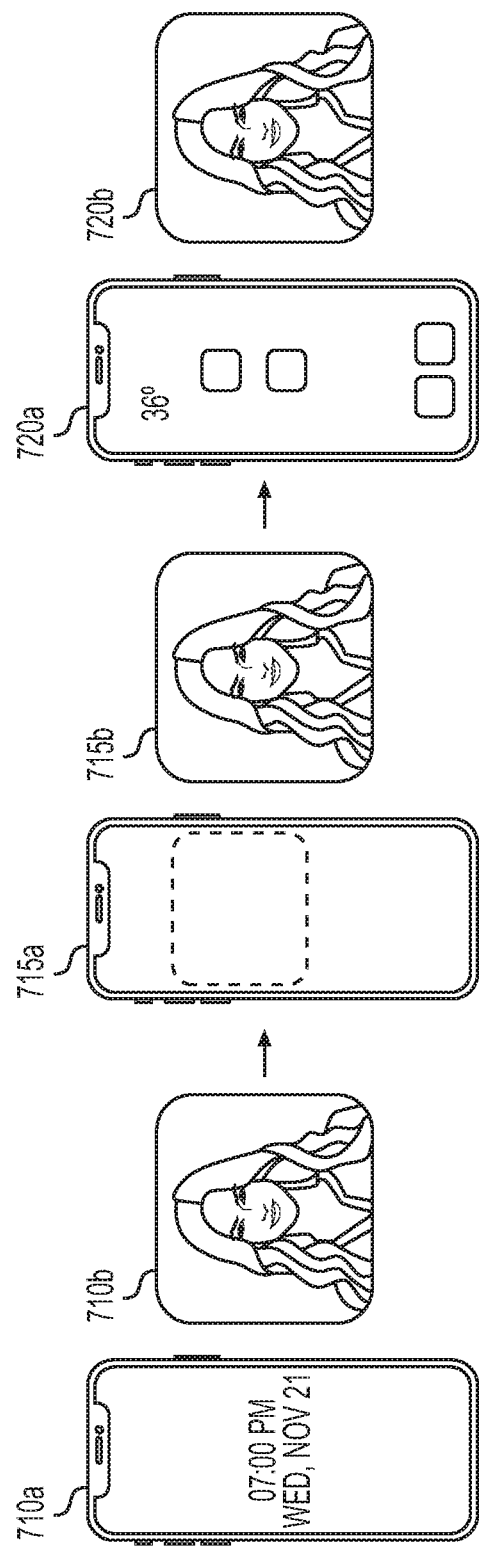
FIG. 7A is an exemplary use case diagram illustrating interactions between a user and a user device during unlocking of the user device.

As alluded to above, in one embodiment, user application 205 may be a device security application. For example, a device security application may enable a user to unlock the user device 110 using a facial recognition technology. FIG. 7A is an exemplary user case diagram illustrating graphical user interface screens of the user application 205 (i.e., device security application that enables locking/unlocking of the user device 110) and the contextual data captured at different stages of the unlock procedure. Similar to FIGS. 3A-3C, FIG. 7A also illustrates a context in which the embodiments contemplated by the present disclosure may be applied.

Transaction component 210 of the user application 205 may present graphical user interface screens to walk a user through one or more facial recognition steps to unlock the user device 110. At step 710a, the user device 110 is "locked" and the lock screen is displayed. If a user wishes to "unlock" the user device 110, the user may touch or swipe the lock screen to enter a "unlock" stage (i.e., facial recognition stage). At step 715a, in response to a user touching or swiping the lock screen, transaction component 210 may present a screen indicating that the facial recognition is being initiated. For example, the screen may show a polygon-shaped or circular-shaped box through which a facial image being captured by the user device 110 may be shown. The screen may direct or steer the user to adjust the position of user device 110 relative to the face, such that the entire face is shown through the box, in order to unlock the user device 110.

While the transaction component 210 may display graphical user interface screens to walk a user through the "unlock" stage (i.e., facial recognition stage), monitoring and detection component 215 may collect contextual data using sensors of the user device 110, to identify suspicious and/or non-suspicious activities that might be associated with the unlock procedure. In one embodiment, monitoring and detection component 215 may direct an image sensor of the user device 110 (i.e., camera) to capture a facial image of the person attempting to unlock the device. For example, as shown in FIG. 7A, facial images of the person using the device 110 or facing the screen of the device 110 (e.g., 710b, 715b) may be captured at different stages of the unlock procedure. For example, facial image 710b may be captured at step 710a (i.e., when a user looks at the lock screen or swipes/touches the lock screen) and/or facial image 715b may be captured at step 715a (i.e., when a user is presented with a screen indicating that facial recognition is being initiated/performed). The monitoring and detection component 215 may compare the captured facial images with one or more facial images of the persons authorized to use the device, which may have been previously saved in the user device 110. At step 720a, in response to the monitoring and detection component 215 determining that the captured facial image matches one of the facial images of the authorized persons, the user device 110 may be unlocked and the user may be presented with a home screen.

During the unlock procedure, monitoring and detection component 215 may also direct other sensors of the user device 110 (i.e., sensors other than the image sensor capturing facial images) to capture additional contextual data during the unlock procedure, to identify any suspicious activities which may not be detectable solely by capturing and analyzing facial images. For example, an unauthorized user may take or steal the user device 110 from an authorized user, swipe or touch the lock screen, and hold the user device 110 in front of the authorized user's face to unlock the device. Detecting suspicious activities of this type may require more than just capturing the facial images of the persons facing the device.

FIG. 7B is another exemplary use case diagram illustrating graphical user interface screens of the user application 205 (i.e., device security application that locks/unlocks the user device 110) and the contextual data captured at different stages of the unlock procedure. FIG. 7B also illustrates a context in which the embodiments contemplated by the present disclosure may be applied. Notably, FIG. 7B illustrates a scenario where detection of a suspicious activity may require using multiple sensors of the user device 110.

At step 725a, the user device 110 is "locked" and the lock screen is displayed. If a user wishes to "unlock" the user device 110, the user may touch or swipe the lock screen to enter a "unlock" stage (i.e., facial recognition stage). At step 730a, in response to a user touching or swiping the lock screen, transaction component 210 may present a screen indicating that the facial recognition is being initiated. For example, the screen may show a polygon-shaped or circular-shaped box through which a facial image being captured by the user device 110 is shown. The screen may direct or steer the user to adjust the position of user device 110 relative to the face, such that the entire face may be shown through the box, in order to unlock the device 110.

As alluded to above, if the person facing the device screen and attempting to unlock the user device 110 is an unauthorized user, the user device 110 may remain locked because the facial image of the user does not match any of the stored facial images of authorized users. However, the unauthorized user may still attempt to unlock the user device 110 by holding the user device 110 in front of an authorized user's face. For example, at step 735a, the unauthorized user may hold the user device 110 in front of an authorized user's face and may "shake" or "wave" the device 110 such that the entire face of the authorized user may be captured at the designated location (i.e., within the box as shown in 735b). If only facial images were used to detect suspicious activities, this behavior (i.e., an unauthorized user "shaking" or "waving" the device 110 in front of the authorized user's face) could go undetected and the device 110 may be unlocked.

Accordingly, a number of sensors may be used for detection. In one embodiment, the movement pattern of "shaking" or "waving" the device 110 in front of an authorized user (i.e., a victim) in conjunction with multiple facial images captured at different stages of the unlocking operation may be used to determine that a suspicious activity is taking place. As discussed above, one or more of global positioning system (GPS) sensors, vision sensors (i.e., cameras), audio sensors (i.e., microphones), light sensors, temperature sensors, radio frequency sensors, direction sensors (i.e., magnetic compasses, magnetometers, gyroscopes), and acceleration sensors (i.e., accelerometers) in the user device 110 may be used to capture contextual data representative of the movement of the device 110 as well as the biometric measurements (e.g., facial images).

With continuing reference to FIG. 7B, using the contextual data collected by various sensors of the user device 110, at step 740a, monitoring and detection component 215 may determine that a suspicious activity is taking place and may keep the user device 110 locked. In some embodiments, the step of keeping the user device 110 locked may involve notifying the transaction component 210 of the fraudulent login or unlock attempt, such that the transaction component 210 may keep the device locked 110 and may display the lock screen.

Figure 8:
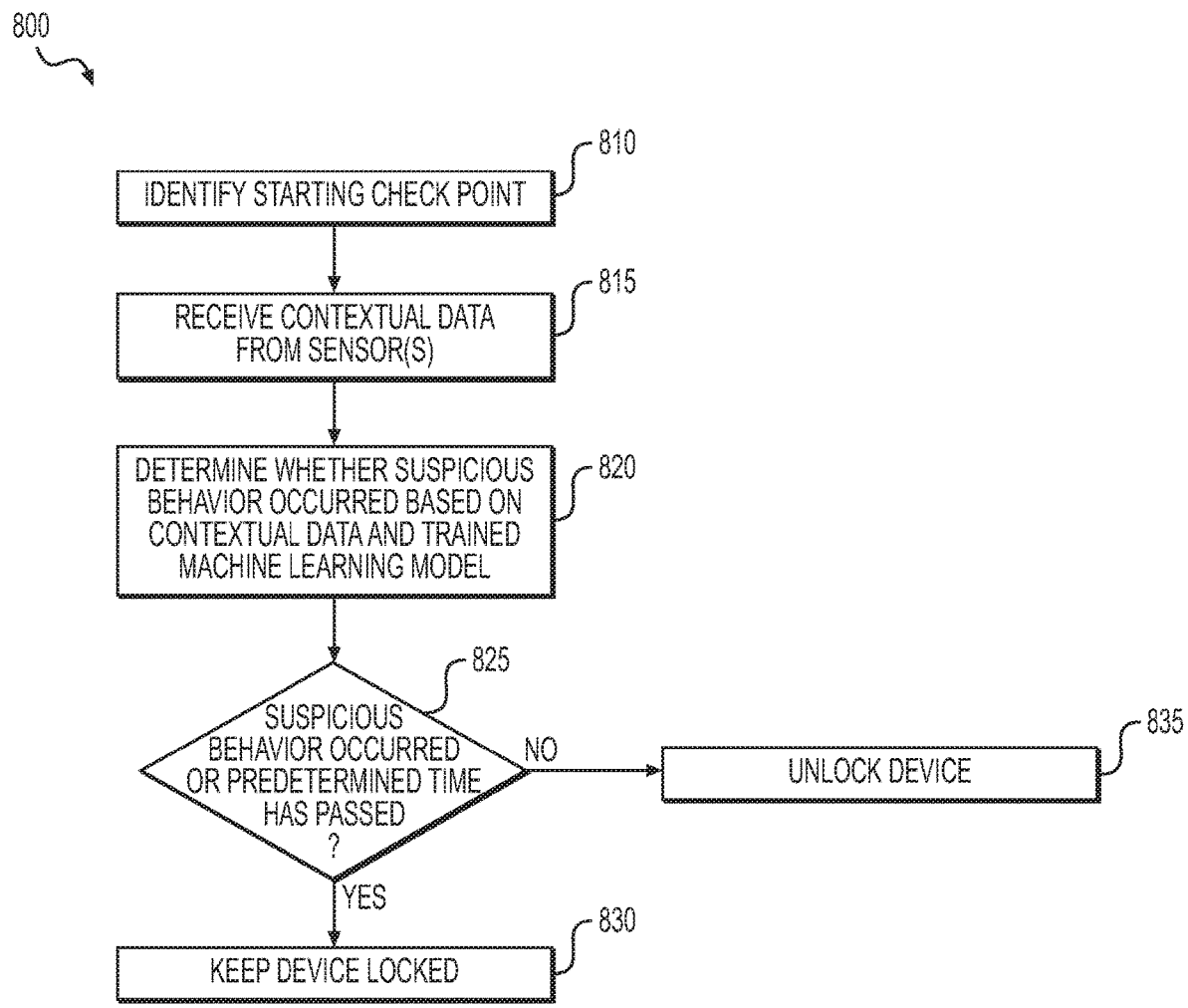
FIG. 8 is a flowchart illustrating an exemplary method of analyzing contextual data to determine an occurrence of a suspicious activity, according to one aspect of the present disclosure.

FIG. 8 is a flowchart illustrating an exemplary method 800 of determining an occurrence of a suspicious activity using a trained machine learning model, according to one aspect of the present disclosure. In particular, the steps of method 800 may be performed by the monitoring and detection component 215, and may be performed in contexts described above with reference to FIGS. 7A-7B (i.e., unlock procedure). However, it should be appreciated that the steps of method 800 may be used in any context to which they may be applicable. Further, methods 400 and 500 of aggregating contextual data representing a target activity and training a machine learning model based on the aggregated contextual data, respectively, may also be used in conjunction with method 800, to determine a target activity discussed below with reference to FIG. 8 (i.e., "shaking" or "waving" user device 110 in front of a victim's face).

At step 810, monitoring and detection component 215 may identify a starting check point. As alluded to above in reference to step 410 in FIG. 4, the starting check point defines a point from which one or more appropriate sensors of the user device 110 may capture contextual data. For instance, in the case of an unlock procedure (e.g., FIGS. 7A-7B), transaction component 210 may alert the monitoring and detection component 215 to begin capturing contextual data at a particular stage of the unlock procedure. For example, transaction component 210 may alert the monitoring and detection component 215 to begin capturing contextual data when a user touches or swipes the lock screen to initiate the unlock process (e.g., step 710a in FIG. 7A, or step 725a in FIG. 7B). In such a case, the point at which the user touches or swipes the lock screen may be the starting check point. However, the starting check point may be set at any point during the unlock procedure. At step 815, monitoring and detection component 215 may start receiving contextual data from the one or more sensors of the user device 110. Then, at step 820, monitoring and detection component 215 may determine whether a suspicious activity (e.g., a user "shaking" or "waving" of the user device 110 in front of another user) has occurred based on the received contextual data and a trained machine learning model received from the model training component 235 (or from the local model training component 245). At step 825, if it is determined that a suspicious activity occurred or a predetermined time has passed since the unlock process was initiated, the method may proceed to step 830 where the monitoring and detection component 215 may keep the device 110 locked and display the lock screen (or directs the transaction component 210 to keep the device 110 locked and to display the lock screen), even if the facial image captured during the unlock stage matches that of an authorized user. At this point (step 830), the monitoring and detection component 215 may also stop receiving contextual data from the one or more sensors (or may direct the one or more sensors to stop transmitting contextual data), as the decision to keep the device locked has been made. On the other hand, at step 825, if it is determined that a suspicious activity did not occur (e.g., no "shaking" or "waiving" of the device 110 in front of an authorized user, and the facial image captured during the unlock stage matches that of an authorized user) and a predetermined time has not passed since the unlock process was initiated, the method may proceed to step 835 where the monitoring and detection component 215 may unlock the device 110 and display the home screen (or directs the transaction component 210 to unlock the device 110 and to display the home screen). At this point (step 835), the monitoring and detection component 215 may also stop receiving contextual data from the one or more sensors (or may direct the one or more sensors to stop transmitting contextual data), as the decision to unlock the device 110 has been made. In another embodiment, at step 830, in addition to keeping the device 110 locked, the monitoring and detection component 215 may send a notification to the owner(s) of the user device 110 (e.g., via an email, a text message, an automated phone call, etc.) that a fraudulent login/unlock attempt has taken place.

It should be appreciated that the use cases illustrated in FIGS. 3A-3C and 7A-7B are merely exemplary, and the embodiments contemplated by the present disclosure may also be applicable to variations of the use cases specifically discussed herein. For example, other use cases may include, but may not be limited to:

Learning the pattern of a mobile QR code ticket being shown to a ticket inspector on a train.

The pattern of movement to present a loyalty QR code to a QR code reader in a store.

The pattern of movement made when tapping a mobile phone onto a contactless reader for payments or for transit.

Combining the movements of two devices to indicate that they were both being moved together for a synchronized process such as a phone to phone payment, or near-field data exchange between two phones.

The embodiments of the present disclosure may be adjusted or modified to encompass varying use case scenarios. For example, with reference to FIGS. 3A-3C, while the buyer's facial image captured at the payment vehicle provision confirmation step (e.g., steps 320a, 340a, 360a) may be considered non-suspicious in the United States of America, the same may not be true for electronic payment transactions occurring in a different country. For example, certain countries may have laws in place that require a mobile terminal to be transferred/presented to the buyer when the payment vehicle is provided (i.e., "swiped" or "tapped") by the buyer. In such a case, the starting check point and the ending check point discussed in reference to FIGS. 4 and 6 may be adjusted in order to capture the contextual data indicative of the transfer (or the lack thereof), which is supposed to occur at a point after the transaction amount entry (e.g., steps 310a, 330a, 350a) but before the payment vehicle provision confirmation (e.g., steps 320a, 340a, 360a).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 9 illustrates an implementation of a general computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 900 can be implemented using electronic devices that provide voice, video, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 904 includes a cache or random-access memory for the processor 902. In alternative implementations, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 900 may further include a display unit 910, such as a liquid crystal display (LCD), an organic light emitting diode (OLED), a flat panel display, a solid-state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 906.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control, or any other device operative to interact with the computer system 900.

The computer system 900 may also or alternatively include a disk or optical drive unit 906. The disk drive unit 906 may include a computer-readable medium 922 in which one or more sets of instructions 924, e.g. software, can be embedded. Further, the instructions 924 may embody one or more of the methods or logic as described herein. The instructions 924 may reside completely or partially within the memory 904 and/or within the processor 902 during execution by the computer system 900. The memory 904 and the processor 902 also may include computer-readable media as discussed above.

In some systems, a computer-readable medium 922 includes instructions 924 or receives and executes instructions 924 responsive to a propagated signal so that a device connected to a network 105 can communicate voice, video, audio, images, or any other data over the network 105. Further, the instructions 924 may be transmitted or received over the network 105 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 105, external media, the display 910, or any other components in system 900, or combinations thereof. The connection with the network 105 may be a physical connection, such as a wired Ethernet connection or may be established wirelessly as discussed below. Likewise, the additional connections with other components of the system 900 may be physical connections or may be established wirelessly. The network 105 may alternatively be directly connected to the bus 908.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 922 may be non-transitory, and may be tangible.

The computer-readable medium 922 can include a solid-state memory such as a memory card or other package that houses one or more non-volatile read-only memories. The computer-readable medium 922 can be a random-access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 10026. The network 105 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 105 may include wide area networks (WAN), such as the Internet, local area networks (LAN), campus area networks, metropolitan area networks, a direct connection such as through a Universal Serial Bus (USB) port, or any other networks that may allow for data communication. The network 105 may be configured to couple one computing device to another computing device to enable communication of data between the devices. The network 105 may generally be enabled to employ any form of machine-readable media for communicating information from one device to another. The network 105 may include communication methods by which information may travel between computing devices. The network 105 may be divided into sub-networks. The sub-networks may allow access to all of the other components connected thereto or the sub-networks may restrict access between the components. The network 105 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method of detecting a suspicious activity and/or a non-suspicious activity during an electronic transaction performed by a user device, comprising:
   receiving, by a model building component, sample contextual data from one or more sensors of a plurality of user devices;
   training, by the model building component using the sample contextual data, a machine learning model to identify suspicious and/or non-suspicious activities;
   receiving, by a monitoring and detection component, contextual data from the one or more sensors of the plurality of user devices;

determining, by the monitoring and detection component and using the trained machine learning model, whether an expected behavior occurred; and in response to determining that the expected behavior occurred:

determining, by the monitoring and detection component, a facial image in the contextual data upon determining a device transfer has occurred; and in response to determining a post device transfer facial image is different from a pre device transfer facial image, enabling, by the monitoring and detection component, entry of user credentials, wherein the entry of the user credentials is disabled upon determining more than one users are staring at the screen of the user device at a credentials entry stage.

2. The method of claim 1, wherein the sample contextual data comprises at least one or more of: i) vector displacement measurements received from an accelerometer of each of the plurality of user devices, ii) rotation measurements received from a gyroscope and a magnetometer of each of the plurality of user devices, iii) sound measurements received from one or more microphones of each of the plurality of user devices, or iv) image data received from one or more cameras of each of the plurality of user devices.

3. The method of claim 1, wherein the contextual data further comprises at least one or more of: i) vector displacement measurements received from an accelerometer of the user device, ii) rotation measurements received from a gyroscope and a magnetometer of the user device, iii) sound measurements received from one or more microphones of the user device, or iv) image data received from one or more cameras of the user device.

4. The method of claim 1, wherein the electronic transaction is terminated in response to determining the expected behavior not occurring within a predetermined amount of time.

5. The method of claim 1, wherein the contextual data further comprises a pre-transfer facial image and a post-transfer facial image, further comprising:

in response to determining an occurrence of the expected behavior:

determining, by the monitoring and detection component, whether a first face detected in the pre-transfer facial image is different from a second face detected in the post-transfer facial image; and in response to determining that the first face is different from the second face, enabling, by the monitoring and detection component, entry of user credentials; or in response to determining that the first face matches the second face, disabling, by the monitoring and detection component, entry of user credentials.

6. The method of claim 1, further comprising:

identifying, by the monitoring and detection component, a starting check point in the electronic transaction using the user device, wherein the monitoring and detection component directs the one or more sensors of the plurality of user devices to begin transmitting the contextual data at the starting check point.

7. The method of claim 6, further comprising:

identifying, by the monitoring and detection component, an ending check point in the electronic transaction using the user device, wherein the monitoring and detection component directs the one or more sensors of the plurality of user devices to halt transmitting the contextual data at the ending check point.

8. A system for detecting a suspicious activity and/or a non-suspicious activity during an electronic transaction performed by a user device, comprising:

one or more processors;

a non-transitory computer readable medium storing instructions which, when executed by the one or more processors, cause the one or more processors to perform a method comprising:

receiving, by a model building component, sample contextual data from one or more sensors of a plurality of user devices;

training, by the model building component using the sample contextual data, a machine learning model to identify suspicious and/or non-suspicious activities;

receiving, by a monitoring and detection component, contextual data from the one or more sensors of the plurality of user devices;

determining, by the monitoring and detection component and using the trained machine learning model, whether an expected behavior occurred; and in response to determining that the expected behavior occurred:

determining, by the monitoring and detection component, a facial image in the contextual data upon determining a device transfer has occurred; and in response to determining a post device transfer facial image is different from a pre device transfer facial image, enabling, by the monitoring and detection component, entry of user credentials, wherein the entry of the user credentials is disabled upon determining more than one users are staring at the screen of the user device at a credentials entry stage.

9. The system of claim 8, wherein the sample contextual data comprises at least one or more of: i) vector displacement measurements received from an accelerometer of each of the plurality of user devices, ii) rotation measurements received from a gyroscope and a magnetometer of each of the plurality of user devices, iii) sound measurements received from one or more microphones of each of the plurality of user devices, or iv) image data received from one or more cameras of each of the plurality of user devices.

10. The system of claim 8, wherein the contextual data further comprises at least one or more of: i) vector displacement measurements received from an accelerometer of the user device, ii) rotation measurements received from a gyroscope and a magnetometer of the user device, iii) sound measurements received from one or more microphones of the user device, or iv) image data received from one or more cameras of the user device.

11. The system of claim 8, wherein the electronic transaction is terminated in response to determining the expected behavior not occurring within a predetermined amount of time.

12. The system of claim 8, wherein the contextual data further comprises a pre-transfer facial image and a post-transfer facial image and the method further comprises:

in response to determining an occurrence of the expected behavior:

determining, by the monitoring and detection component, whether a first face detected in the pre-transfer facial image is different from a second face detected in the post-transfer facial image; and in response to determining that the first face is different from the second face, enabling, by the monitoring and detection component, entry of user credentials; or in response to determining that the first face matches the second face, disabling, by the monitoring and detection component, entry of user credentials.

13. The system of claim 8, wherein the method further comprises:

identifying, by the monitoring and detection component, a starting check point in the electronic transaction using the user device, wherein the monitoring and detection component directs the one or more sensors of the plurality of user devices to begin transmitting the contextual data at the starting check point.

14. The system of claim 13, wherein the method further comprises:

identifying, by the monitoring and detection component, an ending check point in the electronic transaction using the user device, wherein the monitoring and detection component directs the one or more sensors of the plurality of user devices to halt transmitting the contextual data at the ending check point.

15. A non-transitory computer readable medium storing instructions that, when executed by one or more processors, cause the one or more processors to perform a method of detecting a suspicious activity and/or a non-suspicious activity during an electronic transaction performed by a user device, the method comprising:

receiving, by a model building component, sample contextual data from one or more sensors of a plurality of user devices;

training, by the model building component using the sample contextual data, a machine learning model to identify suspicious and/or non-suspicious activities;

receiving, by a monitoring and detection component, contextual data from the one or more sensors of the plurality of user devices;

determining, by the monitoring and detection component and using the trained machine learning model, whether an expected behavior occurred; and in response to determining that the expected behavior occurred:

determining, by the monitoring and detection component, a facial image in the contextual data upon determining a device transfer has occurred; and in response to determining a post device transfer facial image is different from a pre device transfer facial image, enabling, by the monitoring and detection component, entry of user credentials, wherein the entry of the user credentials is disabled upon determining more than one users are staring at the screen of the user device at a credentials entry stage.

16. The non-transitory computer readable medium of claim 15, wherein the sample contextual data comprises at least one or more of: i) vector displacement measurements received from an accelerometer of each of the plurality of user devices, ii) rotation measurements received from a gyroscope and a magnetometer of each of the plurality of user devices, iii) sound measurements received from one or more microphones of each of the plurality of user devices, or iv) image data received from one or more cameras of each of the plurality of user devices.

17. The non-transitory computer readable medium of claim 15, wherein the contextual data further comprises at least one or more of: i) vector displacement measurements received from an accelerometer of the user device, ii) rotation measurements received from a gyroscope and a magnetometer of the user device, iii) sound measurements received from one or more microphones of the user device, or iv) image data received from one or more cameras of the user device.

18. The non-transitory computer readable medium of claim 15, wherein the electronic transaction is terminated in response to determining the expected behavior not occurring within a predetermined amount of time.

19. The non-transitory computer readable medium of claim 15, wherein the contextual data further comprises a pre-transfer facial image and a post-transfer facial image and the method further comprises:

in response to determining an occurrence of the expected behavior:

determining, by the monitoring and detection component, whether a first face detected in the pre-transfer facial image is different from a second face detected in the post-transfer facial image; and in response to determining that the first face is different from the second face, enabling, by the monitoring and detection component, entry of user credentials; or in response to determining that the first face matches the second face, disabling, by the monitoring and detection component, entry of user credentials.

20. The non-transitory computer readable medium of claim 15, wherein the method further comprises:

identifying, by the monitoring and detection component, a starting check point in an electronic transaction using the user device, the monitoring and detection component directing the one or more sensors of the plurality of user devices to begin transmitting the contextual data at the starting check point; and identifying, by the monitoring and detection component, an ending check point in the electronic transaction using the user device, the monitoring and detection component directing the one or more sensors of the plurality of user devices to halt transmitting the contextual data at the ending check point.

* * * * *